(12) United States Patent
Erickson et al.

(10) Patent No.: US 7,089,413 B2
(45) Date of Patent: Aug. 8, 2006

(54) DYNAMIC COMPUTER SYSTEM RESET ARCHITECTURE

(75) Inventors: Michael John Erickson, Loveland, CO (US); David L. Tharp, Fort Collins, CO (US); Daniel V. Zilavy, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 481 days.

(21) Appl. No.: 10/382,346

(22) Filed: Mar. 5, 2003

(65) Prior Publication Data

US 2004/0177242 A1 Sep. 9, 2004

(51) Int. Cl.
*G06F 15/177* (2006.01)
(52) U.S. Cl. .............................. 713/2; 713/1
(58) Field of Classification Search .............. 713/1, 713/2, 100
See application file for complete search history.

(56) References Cited

U.S. PATENT DOCUMENTS

| | | | | |
|---|---|---|---|---|
| 5,068,780 A | * | 11/1991 | Bruckert et al. | 713/2 |
| 5,379,437 A | | 1/1995 | Celi, Jr. et al. | |
| 5,717,942 A | * | 2/1998 | Haupt et al. | 712/13 |
| 5,870,602 A | * | 2/1999 | Miller et al. | 713/1 |
| 6,012,154 A | | 1/2000 | Poisner | |
| 6,697,973 B1 | * | 2/2004 | Baumeister et al. | 714/55 |
| 2002/0174383 A1 | * | 11/2002 | Hikosaka et al. | 714/34 |
| 2003/0152074 A1 | * | 8/2003 | Hawkins et al. | 370/389 |
| 2003/0204708 A1 | * | 10/2003 | Hulme et al. | 713/1 |
| 2004/0139259 A1 | * | 7/2004 | Mantey et al. | 710/113 |

FOREIGN PATENT DOCUMENTS

| | | |
|---|---|---|
| EP | 1195689 A2 | 10/2002 |
| JP | 5224778 | 11/1991 |
| JP | 2001265468 | 9/2001 |
| WO | WO02/17088 A2 | 2/2002 |

* cited by examiner

*Primary Examiner*—Lynne H. Browne
*Assistant Examiner*—Fahmida Rahman

(57) ABSTRACT

Techniques are disclosed for resetting agents in a computer system without requiring the computer system, or partitions thereof, to be reset. In one embodiment, each agent in the system is associated with a corresponding partition. A reset signal directed to an agent is redirected to a reset type selector which determines whether the partition associated with the agent is in a run state (an "unsafe run state") in which resetting the agent will cause the partition to crash. If the partition is in an unsafe run state, a soft reset is performed on the agent. Otherwise, a hard reset is performed on the agent. If performing a soft reset does not solve the problem that was the impetus for the reset signal, the partition may be brought into a safe run state before performing a hard reset on it.

59 Claims, 7 Drawing Sheets

DYNAMIC COMPUTER SYSTEM RESET ARCHITECTURE

BACKGROUND

1. Field of the Invention

The present invention relates to techniques for resetting components of a computer system and, more particularly, to techniques for resetting agents in a computer system without disrupting the operation of the computer system.

2. Related Art

All computer systems include a reset architecture of some kind. A computer system's reset architecture is responsible for resetting some or all of the components of the system to an initial state. A reset may be initiated, for example, when a computer system is booted up, in response to a user pressing a hardware reset button, or in response to an automated or user-invoked software reset instruction. If the computer system crashes, for example, it may be necessary for the user to invoke a hard reset by pressing a hardware reset button, thereby causing the computer system's memory and other components to be re-initialized and again become usable. Frequently, many or all components within a computer system are reset from the same reset signal, thereby ensuring that the overall system starts up in a defined state. The reset architecture in a standalone desktop computer, for example, typically uses a single reset signal to initiate a reset of all necessary components.

More complex computer systems may include multiple autonomous devices, such as embedded microcontrollers, system processors, or sets of complex logic. Each of these devices—referred to herein as "agents"—may have a distinct reset source. The term "multi-agent system" is used herein to refer to any computer system that includes multiple agents.

One example of a multi-agent computer system is a partitionable server, also referred to as a "consolidation server" or a "multi-partition computer." Referring to FIG. 1A, for example, a functional block diagram is shown of a prior art partitionable server 100. The partitionable server 100 is a single physical computer system that is logically subdivided into multiple partitions 104a–c, each of which is allocated a portion of the server's hardware and/or software resources. Each of the partitions 104a–c may execute its own operating system and software applications. For example, as shown in FIG. 1A, partitions 104a–c execute operating systems 114a–c, respectively.

More generally, each of the partitions 104a–c is intended to be functionally equivalent to, and therefore externally indistinguishable from, a distinct standalone computer. Partitionable servers are sometimes referred to as "consolidation servers" because they may be used to consolidate several physical servers into one physical server having multiple partitions, each of which performs the functions of the physical server that it replaces. A conventional desktop or laptop computer may be considered to be a special case of a multi-partition computer, in which the number of partitions is one.

In the particular example shown in FIG. 1A, the partitionable server 100 also includes a plurality of agents 108a–c. The partitions 104a–c run off of main system power in a main power domain 102, while the agents 108a–c run off of auxiliary power in an auxiliary power domain 106, meaning that the agents 108a–c can continue to receive power even when the main power domain 102 is not providing power. In the example illustrated in FIG. 1A, each of the agents 108a–c monitors and supports a corresponding one of the partitions 104a–c. Partitions 104a–c and agents 108a–c communicate with each other over communications links 112a–c, respectively.

Each of the agents 108a–c includes its own reset circuitry, and agents 108a–c are capable of being independently reset by reset signals transmitted on reset lines 110a–c, respectively. As a result, it is possible for some of the agents 108a–c to be in the process of resetting while corresponding ones of the partitions 104a–c are still running. In some cases, one of the agents 108a–c and a corresponding one of the partitions 104a–c may be communicating with each other when the agent goes into reset unexpectedly (e.g., as the result of a watchdog timer triggering a reset or a user forcing a reset).

In multi-partition computers, such as the partitionable server 100 shown in FIG. 1A, it is highly desirable that the partitions 104a–c be isolated and independent, so that a failure (such as an operating system crash) in one of the partitions 104a–c does not cause a failure in other ones of the partitions 104a–c. Achieving this goal can be challenging for the system designer in many ways. In particular, it can be challenging to design the system 100 so that the act of resetting one of the agents 108a–c does not require the corresponding one of the partitions 104a–c, or the entire server 100, to be reset.

In most cases, the unexpected reset of one of the agents 108a–c will not disrupt the operation of either the corresponding partition or other ones of the partitions 104a–c in the server 100. In fact, partitionable servers and other multi-agent systems are typically designed to handle such an event gracefully. In certain circumstances, however, the unexpected reset of one of the agents 108a–c may cause undesirable effects, such as causing the corresponding one of the partitions 104a–c, or even the entire server 100, to crash. Typically, the server 100 may only be brought back into an operational state after such a crash by powering down the entire server 100 and then powering it back up again. This is one example of a "hard reset." A complete system crash and reboot is extremely undesirable, particularly in cases in which the server 100 is relied upon for constant connectivity by hundreds or even thousands of other computer systems and peripherals.

Consider, for purposes of example, the agent 108a and the corresponding partition 104a. One set of circumstances under which an unexpected reset of the agent 108a may cause the corresponding partition 104a (or the entire server 100) to crash is when the partition 104a is in a run state in which the operating system 114a executing on the partition 104a assumes that the agent 108a will always be available for communication over the communications link 112a. Examples of agents that may be relied upon for such constant availability include, for example, input/output (I/O) controllers, hard disk drive controllers, local area network (LAN) controllers, manageability processors, crossbar circuitry, bus bridges, and circuits for monitoring and/or controlling components such as cooling fans. If the operating system 114a attempts to communicate with the agent 108a over the communications link 112a and the agent 108a does not respond (e.g., because the agent 108a is in the process of resetting), the operating system 114a may crash, thereby making the partition 104a inoperable until it is reset.

Therefore, under such conditions it is unsafe to reset the agent 108a because doing so may cause the corresponding partition 104a to crash. Any run state of a partition in which resetting the corresponding agent is likely or certain to cause the partition to crash will be referred to herein as an "unsafe run state." Any run state of a partition in which resetting the corresponding agent is not likely or certain to cause the partition to crash will be referred to herein as a "safe run state."

When the partition 104a, for example, is in a safe run state, conventional techniques may be employed to reset the agent 108a because resetting the agent 108a will not cause the partition 104a or the other partitions 104b–c to crash. When the partition 104a is in an unsafe run state, however, a different reset scheme must be used to avoid the undesirable effects described above.

What is needed, therefore, are improved techniques for resetting agents in computer systems.

SUMMARY

Techniques are disclosed for resetting agents in a computer system without requiring the computer system, or partitions thereof, to be reset. In one embodiment, each agent in the system is associated with a corresponding partition. A reset signal directed to an agent is redirected to a reset type selector which determines whether the partition associated with the agent is in a run state (an "unsafe run state") in which resetting the agent will cause the partition to crash. If the partition is in an unsafe run state, a soft reset is performed on the agent. Otherwise, a hard reset is performed on the agent. If performing a soft reset does not solve the problem that was the impetus for the reset signal, the partition may be brought into a safe run state before performing a hard reset on it.

In one aspect of the present invention, a method is provided for use in a computer system including a first agent and a second agent. The method includes steps of: (A) receiving a first reset signal directed to the first agent; (B) determining whether the second agent is in a run state in a predetermined class of run states in which a hard reset may be performed on the first agent without requiring the second agent to be reset; (C) performing a hard reset on the first agent if it is determined that the second agent is in a run state in the predetermined class of run states; and (D) performing a soft reset on the first agent if it is determined that the second agent is not in a run state in the predetermined class of run states. The computer system may, for example, include a plurality of partitions, and the second agent may, for example, be one of the plurality of partitions.

In another aspect of the present invention, a method is provided for use in a computer system including an agent and a partition associated with the agent. The method includes steps of: (A) receiving a first reset signal directed to the agent; (B) determining whether the partition is in a run state in a predetermined class of run states in which a hard reset may be performed on the agent without requiring the partition to be reset; (C) performing a hard reset on the agent by transmitting a second reset signal to the agent if it is determined that the partition is in a run state in the predetermined class of run states; and (D) resetting fewer than all of a plurality of components of the agent by transmitting an interrupt to the agent if it is determined that the partition is not in a run state in the predetermined class of run states. Step (D) may, for example, be performed without resetting the partition.

In yet another aspect of the present invention, a device is provided for use in a computer system including a first agent and a second agent. The device includes: receiving means for receiving a first reset signal directed to the first agent; determining means for determining whether the second agent is in a run state in a predetermined class of run states in which a hard reset may be performed on the first agent without requiring the second agent to be reset; hard reset means for performing a hard reset on the first agent if it is determined that the second agent is in a run state in the predetermined class of run states; and soft reset means performing a soft reset on the first agent if it is determined that the second agent is not in a run state in the predetermined class of run states.

In yet a further embodiment of the present invention, a reset architecture is provided for use in a computer system including a first agent and a second agent. The reset architecture includes: a run state identifier coupled to the second agent and comprising an output providing a run state signal indicative of a run state of the second agent; a demultiplexer comprising a data input coupled to at least one reset source, a selection input coupled to the output of the run state identifier, an interrupt output coupled to an interrupt input of the first agent, and a reset output coupled to a reset input of the first agent; wherein the first agent comprises means for performing a hard reset in response to receipt of a reset signal on the reset input and means for performing a soft reset in response to receipt of an interrupt signal on the interrupt input.

In another aspect of the present invention, a method is provided for use in a computer system including a partition and an agent associated with the partition. The method includes steps of: (A) receiving a first reset signal directed to the agent; (B) in response to the first reset signal, performing a soft reset on the agent while the partition is in a first run state in a first predetermined class of run states in which a hard reset may not be performed on the agent without requiring the partition to be reset; and (C) performing a hard reset on the agent while the partition is in a second run state in a second predetermined class of run states in which a hard reset may be performed on the agent without requiring the partition to be reset.

In yet another aspect of the present invention, a method is provided for use in a computer system including a partition and an agent associated with the partition. The method includes steps of: (A) receiving a first reset signal directed to the agent; (B) in response to the first reset signal, performing a soft reset on the agent without resetting the partition by transmitting an interrupt signal to the agent while the partition is in a first run state in a first predetermined class of run states in which a hard reset may not be performed on the agent without requiring the partition to be reset; (C) determining that the partition is in a second run state in a second predetermined class of run states in which a hard reset may be performed on the agent without requiring the partition to be reset; and (D) performing a hard reset on the agent by transmitting a second reset signal to the agent while the partition is in the second run state.

In a further aspect of the present invention, a device is provided for use in a computer system including a partition and an agent associated with the partition. The device includes: receiving means for receiving a first reset signal directed to the agent; soft reset means for performing a soft reset on the agent while the partition is in a first run state in a first predetermined class of run states in which a hard reset may not be performed on the agent without requiring the partition to be reset; and hard reset means for performing a hard reset on the agent while the partition is in a second run state in a second predetermined class of run states in which a hard reset may be performed on the agent without requiring the partition to be reset.

Other features and advantages of various aspects and embodiments of the present invention will become apparent from the following description and from the claims.

DETAILED DESCRIPTION

Techniques are disclosed for resetting agents in a computer system without requiring the computer system, or partitions thereof, to be reset. In one embodiment, each agent in the system is associated with a corresponding partition. A reset signal directed to an agent is redirected to a reset type selector which determines whether the partition associated with the agent is in a run state (an "unsafe run state") in which resetting the agent will cause the partition to crash. If the partition is in an unsafe run state, a soft reset is performed on the agent. Otherwise, a hard reset is performed on the agent. If performing a soft reset does not solve the problem that was the impetus for the reset signal, the partition may be brought into a safe run state before performing a hard reset on it.

In one aspect of the present invention, techniques are provided for resetting an agent in a computer system without requiring the computer system to be rebooted. In particular, techniques are provided for resetting an agent in a multi-agent, multi-partition computer system without requiring a partition associated with the agent to be rebooted.

Figure 1A:
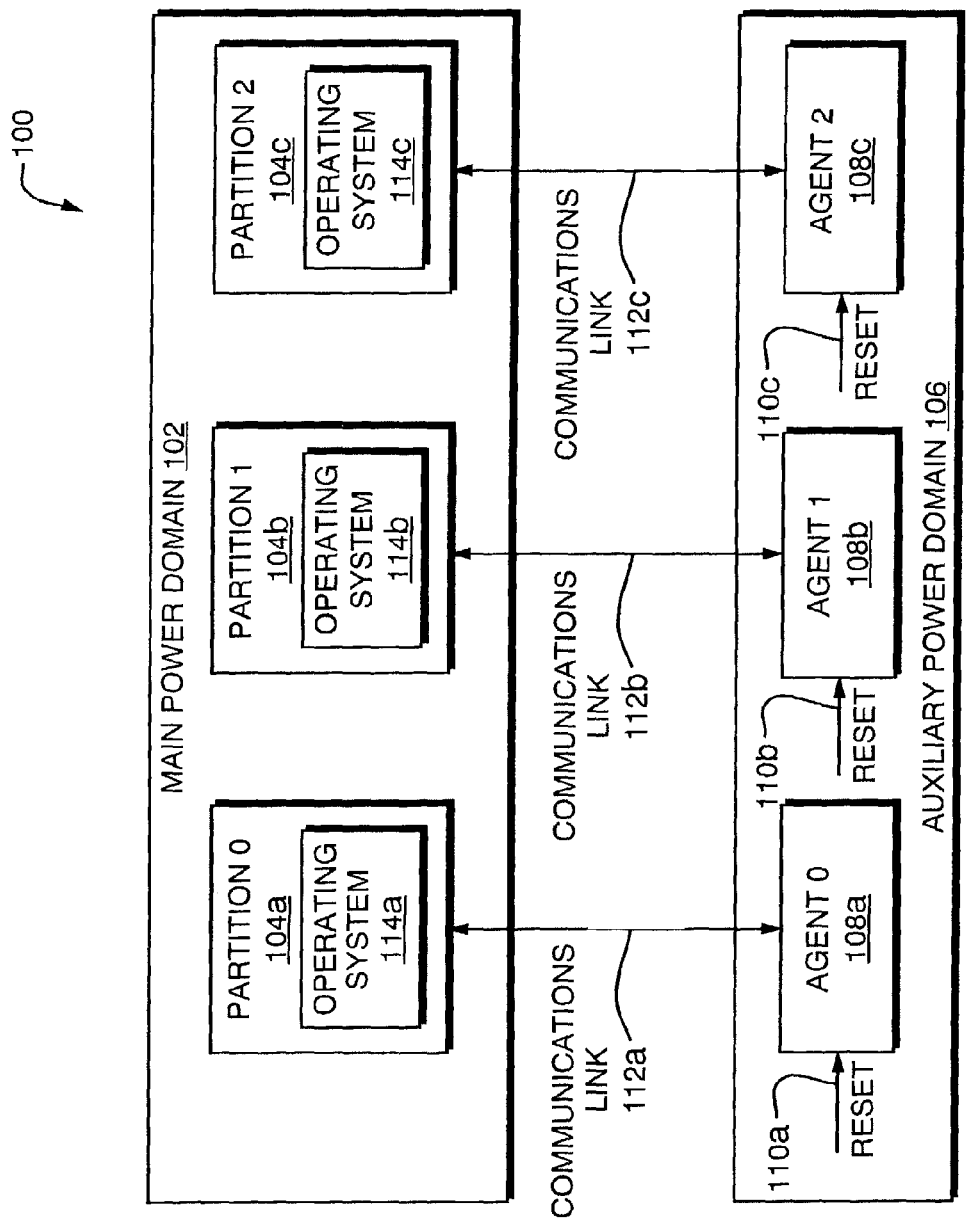
FIG. 1A is a functional block diagram of a prior art partitionable server.
Figure 2:
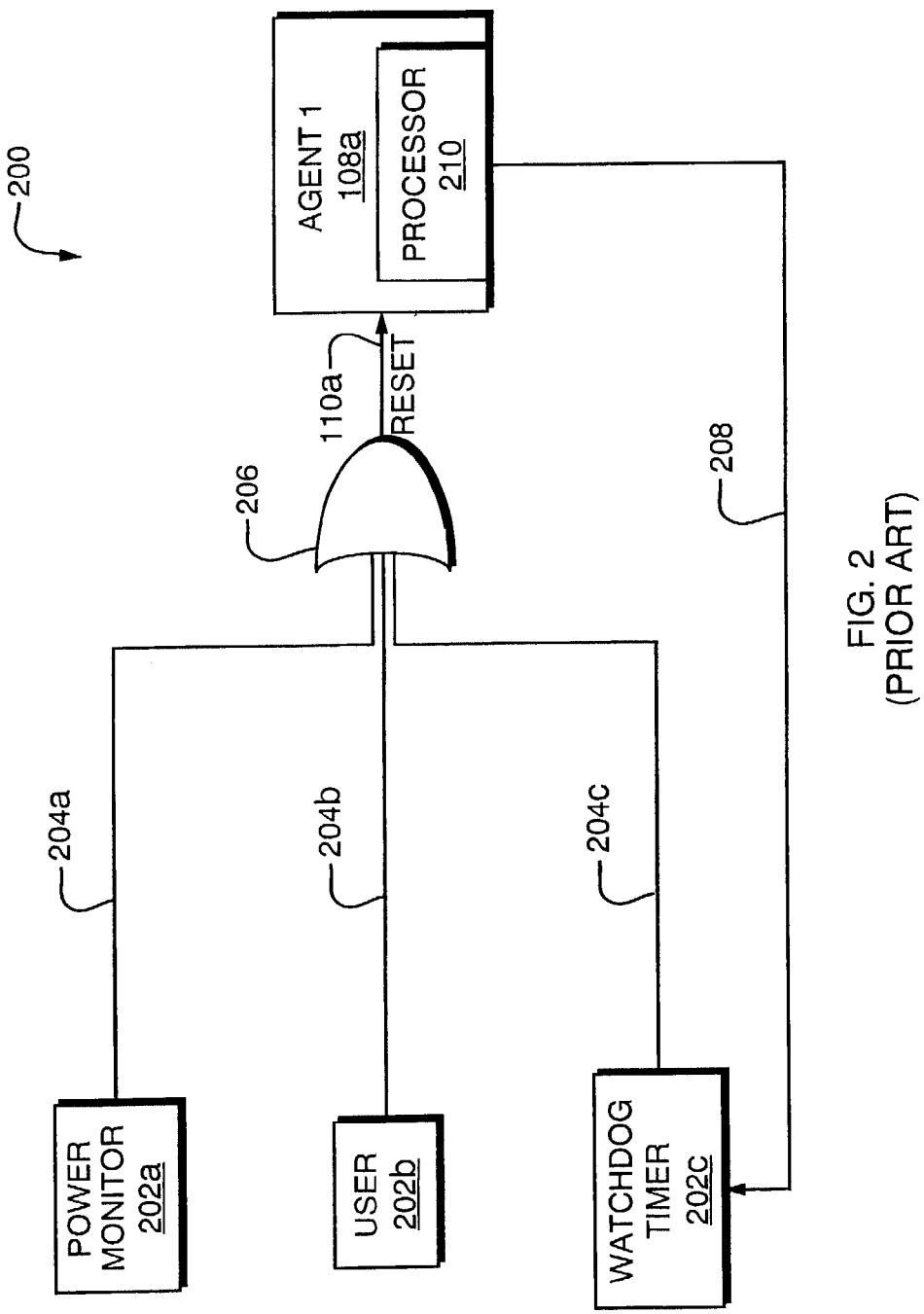
FIG. 2 is a functional block diagram of a prior art reset architecture for use in the server of FIG. 1A.

Before describing particular embodiments of the present invention, prior art techniques for resetting agents in computer systems will be described. Referring to FIG. 2, a prior art reset architecture 200 is shown for use in the prior art server 100 of FIG. 1A. The reset architecture 200 is used to control the resetting of agent 108a. The same reset architecture may be used in conjunction with the other agents 108b–c of the server 100.

Three reset sources 202a–c are shown in FIG. 2 for purposes of example. Power monitor 202a monitors the power being provided to the agent 108a in the auxiliary power domain 106. If the power monitor 202a senses a discontinuity in the supplied power or a dip in the level of supplied power below a predetermined threshold level, the power monitor 202a may generate a reset signal on reset line 204a. Techniques for implementing power monitors are well known to those of ordinary skill in the art.

User 202b may generate a reset signal on reset line 204b by, for example, pressing a hardware reset button (not shown) on the server 100. The user 202b may, for example, press the reset button upon determining that the operating system 114a executing in the partition 104a has crashed. The user 202b may also generate the reset signal 204b indirectly by issuing a software reset command to the operating system 114a. In response, the operating system 114a may perform a software shutdown sequence (e.g., by terminating all software application programs executing in the partition 104a) and then generate a reset signal on the reset line 204b.

Watchdog timer 202c generates a reset signal on reset line 204c if the agent 108a has been inactive for more than a predetermined threshold period of time. Although the watchdog timer 202c may be implemented in many ways, in one implementation the watchdog timer 202c is a timer that is initialized to a zero value and which is incremented each clock cycle. Agent 108a may include a processor 210 which periodically resets the watchdog timer 202c to zero by 208. The frequency at which the processor 210 resets the watchdog timer 202c is chosen so that the value of the watchdog timer 202c will never reach a particular predetermined threshold value if the agent 108a is behaving normally. If the value of the watchdog timer 202c reaches the predetermined threshold value, then it is likely that the processor 210 has crashed or that the agent 108a is otherwise malfunctioning. In the event that the timer 202c reaches the predetermined threshold value, the watchdog timer 202c generates a reset signal on reset line 204c.

Reset lines 204a–c are coupled to the inputs of an OR gate 206, the output of which is coupled to reset line 110a. The agent 108a includes reset circuitry (not shown) which resets the agent 108a if a high logical value is detected on the reset line 110a. As a result, the agent 108a will be reset if any of the reset sources 202a–c generates a reset signal on any of the reset lines 204a–c. The particular internal circuitry required to reset the agent 108a may vary from agent to agent, and techniques for implementing such reset circuitry are well known to those of ordinary skill in the art.

One problem with the reset architecture 200 shown in FIG. 2 is that it causes the agent 108a to be reset automatically in response to a reset signal generated by any of the reset sources 202a–c, even if the corresponding partition 104a is in an unsafe run state (i.e., a run state in which resetting the agent 108a is likely or certain to cause the partition 104a to crash). As a result, a reset initiated by one of the reset sources 202a–c may cause the partition 104a, or even the entire server 100, to crash, without providing the user 202b with any warning that such a crash might occur or any opportunity to prepare for such a crash.

Figure 1B:
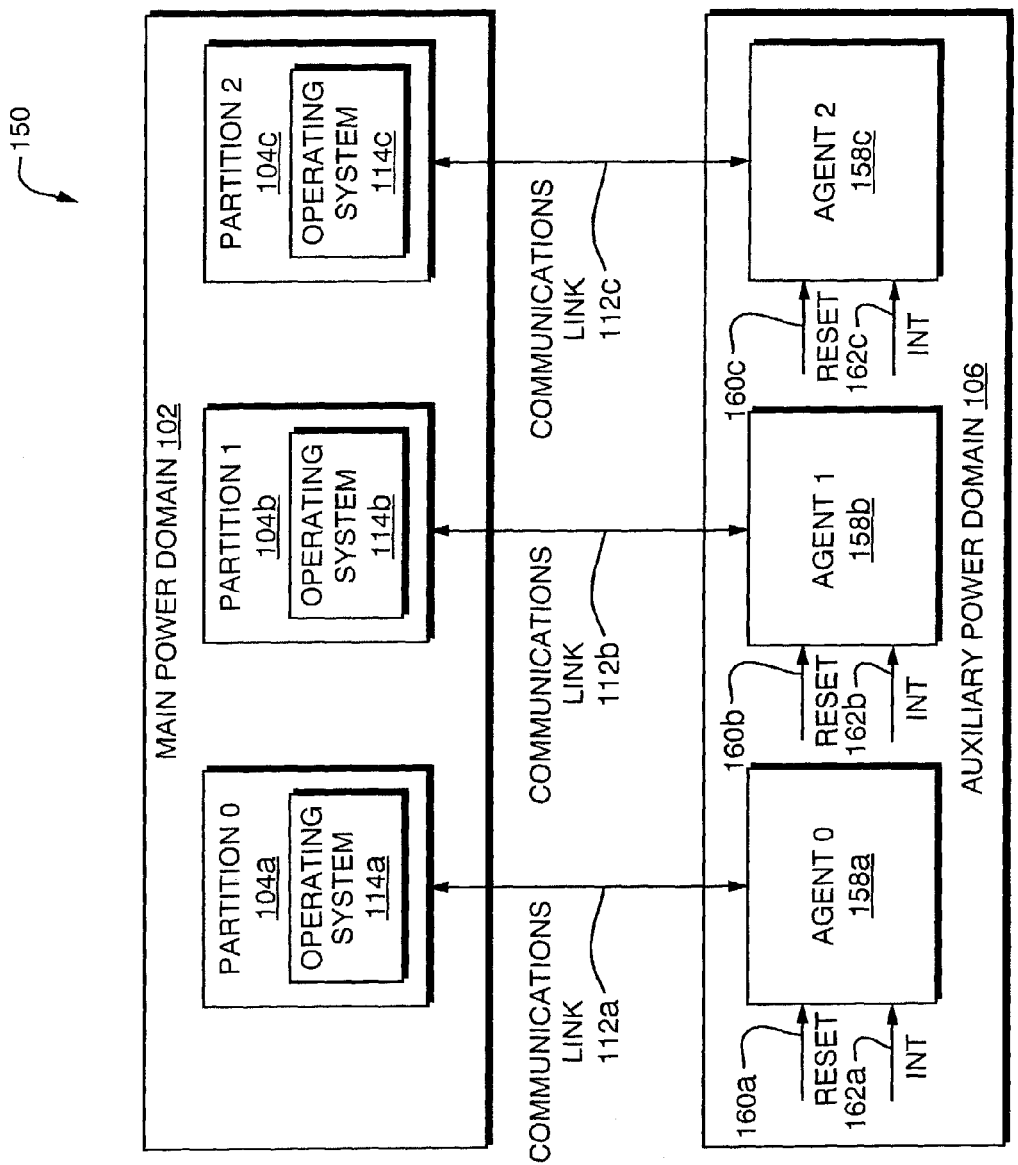
FIG. 1B is a functional block diagram of a partitionable server according to one embodiment of the present invention.

Referring to FIG. 1B, a functional block diagram is shown of a partitionable server 150 according to one embodiment of the present invention. Like the prior art partitionable server 100, the partitionable server 150 includes partitions 104a–c operating in main power domain 102. Partitionable server 150 also includes agents 158a–c, which communicate with partitions 104a–c over communications links 112a–c, respectively. Agents 158a–c, like agents 108a–c (FIG. 1A), are reset by signals on reset lines 160a–c. In addition, agents 158a–c may also receive interrupts on interrupt lines 162a–c, respectively. As described in more detail below, hard resets may be performed on agents 158a–c by transmitting reset signals on reset lines 160a–c, while "soft" resets may be performed on agents 158a–c by transmitting appropriate interrupt signals on interrupt lines 162a–c.

Figure 3:
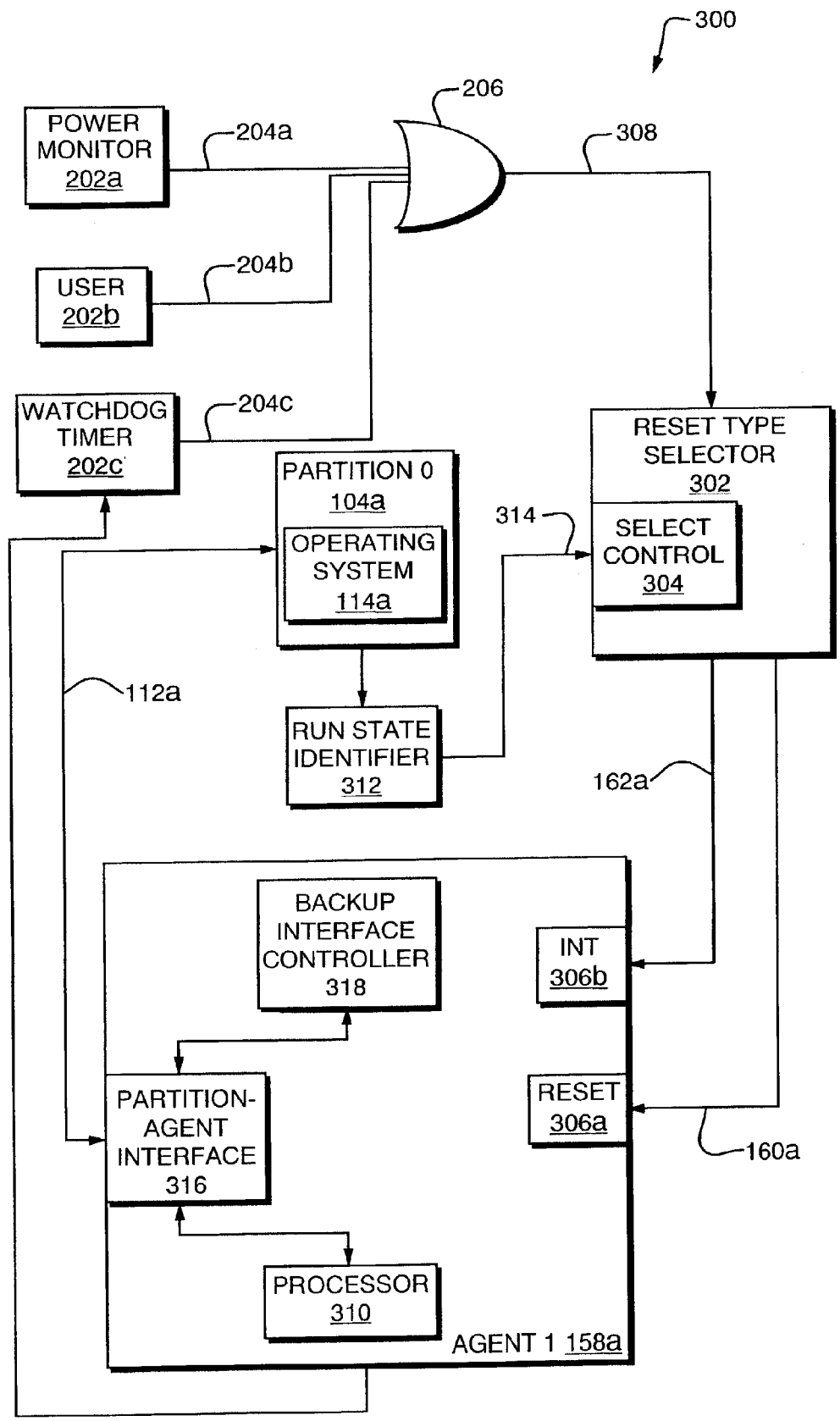
FIG. 3 is a functional block diagram of a reset architecture for use in the server of FIG. 1B according to one embodiment of the present invention.

Referring to FIG. 3, for example, a block diagram is shown of a reset architecture 300 for resetting the agent 158a according to one embodiment of the present invention. The reset architecture 300 is equally applicable to the other agents 158b–c. As in the prior art reset architecture 200 (FIG. 2), the reset architecture 300 includes reset sources 202a–c coupled to OR gate 206. The output 308 of OR gate 206, however, is coupled to reset type selector 302 rather than directly to the agent 158a. As will now be described in more detail, when reset type selector 302 receives a reset signal from the output 308 of OR gate 206, reset type selector 302 determines whether agent 158a should perform a hard reset or a soft reset based on characteristics of the current run state of the corresponding partition 104a.

Figure 4:
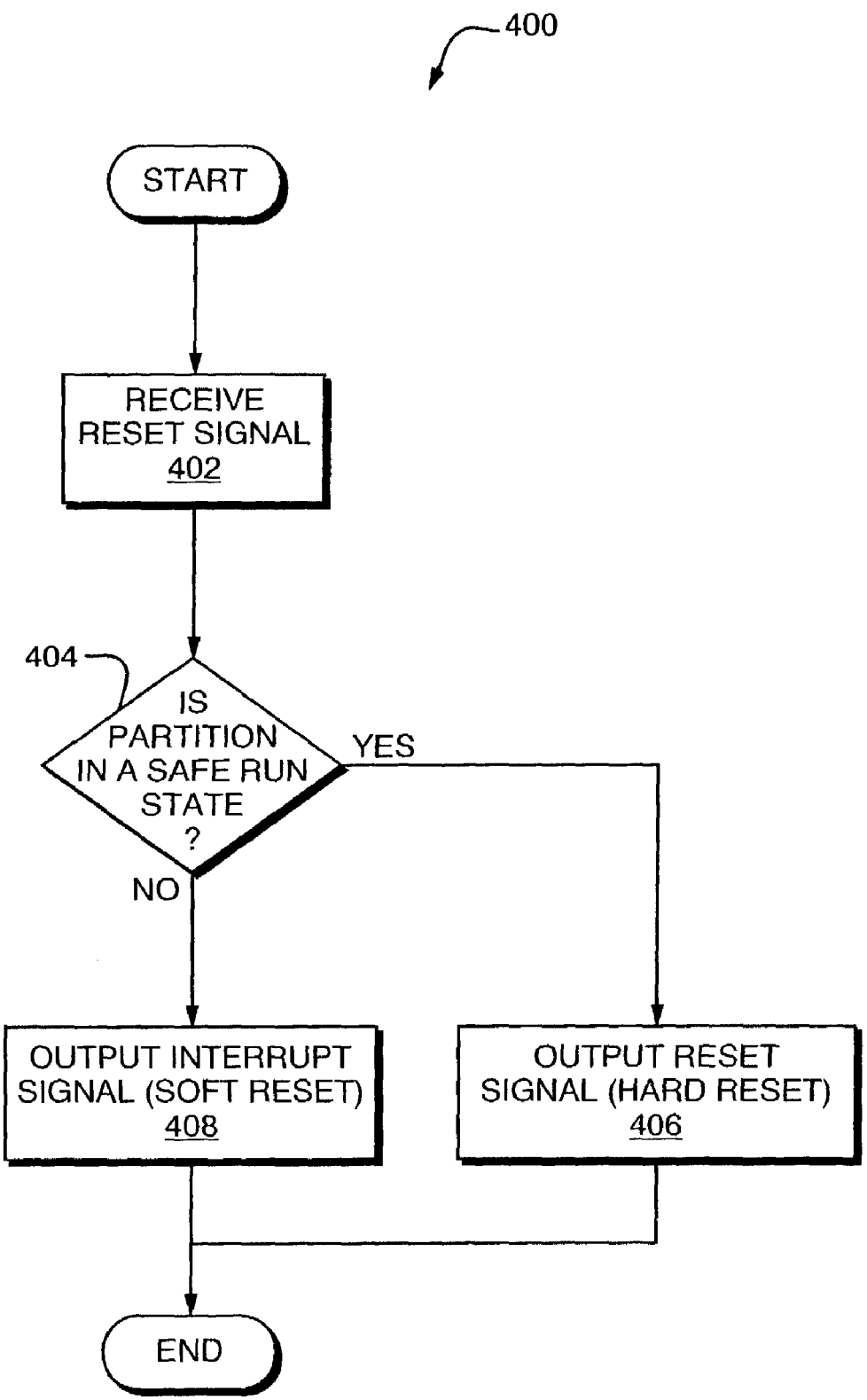
FIG. 4 is a flowchart of a method for resetting the agent of FIG. 3 according to a first embodiment of the present invention.

Referring to FIG. 4, a flowchart is shown of a method 400 that is performed by the reset type selector 302 in one embodiment of the present invention to control the actions performed by the agent 158a in response to the transmission of a reset signal on the output 308 of the OR gate 206.

The method 400 operates as follows. The reset type selector 302 receives a reset signal 402 on the output 308 of the OR gate 206 (step 402). In response to receiving the reset signal, the reset type selector 302 determines whether the partition 104a is in a safe run state (step 404).

The reset type selector 302 may determine whether the partition 104a is in a safe run state in any of a variety of ways. For example, in one embodiment, the reset architecture 300 includes a run state identifier 312 which is coupled to the partition 104a and which determines whether the partition 104a is in a safe run state or an unsafe run state. The run state identifier 312 outputs a run state signal on line 314. The run state signal may be a binary signal, in which case a first binary value on the run state signal line 314 may indicate that the partition 104a is in a safe run state, while a second binary value on the run state signal line 314 may indicate that the partition 104a is not in a safe run state. The run state signal 314 may be provided to a select control input 304 of the reset type selector 302. The reset type selector 302 may, therefore, either include or otherwise perform the functions of a demultiplexer, in which line 308 is the data input, line 314 is the selection (address) input, and lines 160a and 162a are the data outputs.

The run state identifier 312 may determine whether the partition 104a is in a safe run state in any of a variety of ways. For example, in one embodiment, the run state identifier 312 determines whether the operating system 114a is executing on the partition 104a. If the operating system 114a is executing on the partition 104a the run state identifier 312 determines that the partition 104a is not in a safe run state. Conversely, if the operating system 114a is not executing on the partition 104a the run state identifier determines that the partition 104a is in a safe run state. The run state identifier 312 may determine whether the partition 104a is in a safe run state based on other criteria, such as whether any software application programs are executing on the partition 104a, whether there are any open network connections in the partition 104a, or whether the partition 104a is in the process of communicating with the agent 158a over the communications link 112a.

If the reset type selector 302 determines (in step 404) that the partition 104a is in a safe run state, the reset type selector 302 outputs a reset signal on reset line 160a (step 406). Agent 158a receives the reset signal at a reset input 306a and, in response, performs a conventional reset, also referred to as a "hard reset," as described above with respect to FIG. 2. The agent 158a includes a processor 310 which may perform functions including periodically resetting the watchdog timer 202c. A hard reset on the agent 158a may, for example, reset the processor 310 and other necessary components of the agent 158a. Because the partition 104a is in a safe run state, performing a hard reset on the agent 158a does not disrupt the operation of either the partition 104a or the remaining partitions 104b–c. When the agent 158a has completed its reset, it may resume normal operation and communications with the partition 104a over the communications link 112a.

Figure 5:
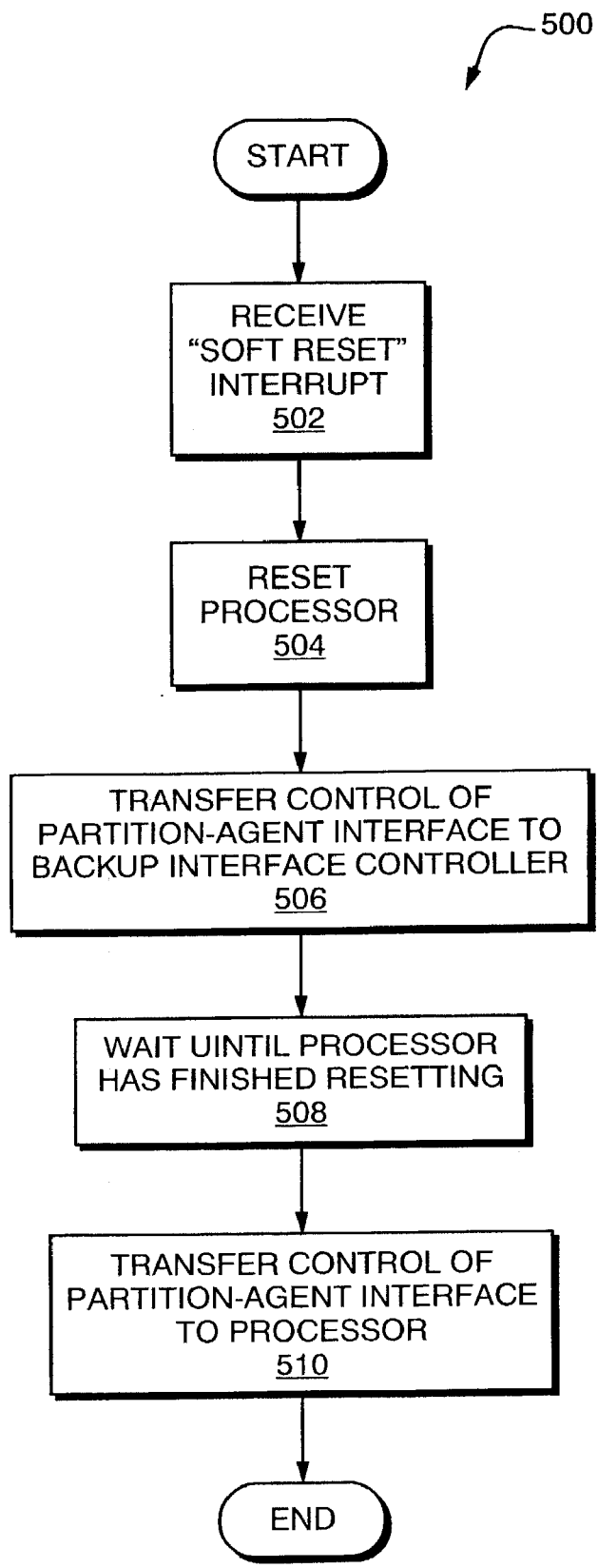
FIG. 5 is a flowchart of a method for performing a soft reset on the agent of FIG. 3 according to one embodiment of the present invention.

If the reset type selector 302 determines (in step 404) that the partition 104a is not in a safe run state, the reset type selector 302 outputs an interrupt signal on interrupt line 162a to initiate a "soft reset" of the agent 158a (step 408). Referring to FIG. 5, a flowchart is shown of a method 500 that is performed by the agent 158a to perform a soft reset in one embodiment of the present invention. The method 500 may, for example, implement step 408 of the method 400 illustrated in FIG. 4.

The agent 158a receives an interrupt from reset type selector 302 on interrupt line 162a (step 502). This interrupt is referred to herein as a "soft reset" interrupt because it instructs the agent 158a to perform a soft reset. As shown in FIG. 3, in one embodiment the agent 158a includes an interrupt input 306b at which it may receive the soft reset interrupt on line 162a.

The agent 158a services the soft reset interrupt by performing a soft reset. As used herein, the term "soft reset" refers to resetting fewer than all of the resources of the agent 158a. The term "resources" includes both hardware resources such as processors and memory, and software resources such as operating systems and application programs. Examples of techniques for performing soft resets will be described in more detail below.

In one embodiment, the agent 158a is configured to service interrupts having priorities ranging from a predetermined minimum priority to a predetermined maximum priority. The interrupt generated by the reset type selector 302 on the interrupt line 162a may have the maximum interrupt priority. As a result, the interrupt generated by the reset type selector 302 is guaranteed to override any other interrupts being serviced by the agent 158a and any other activities being performed by the agent 158a, so long as the agent 158a is not so completely disabled that it is unable to service interrupts.

In one embodiment of the present invention the agent 158a includes an agent-partition interface 316 and a backup interface controller 318. The agent-partition interface 316 mediates communication between the partition 104a and the agent 158a. During normal operation of the agent 158a, the processor 310 performs the functions of an interface controller to communicate with the partition 104a through the agent-partition interface 316, while the backup interface controller 318 is dormant. The backup interface controller 318 may, for example, be implemented in software, firmware, custom-designed circuitry, or any combination thereof.

In one embodiment, the backup interface controller 318 is capable of performing basic communications functions to communicate with the partition 104a through the agent-partition interface 316. In one embodiment, when the agent 158a receives a soft reset interrupt from the reset type selector 302 at interrupt input 306a, the agent 158a services the interrupt by resetting the processor 310 (step 504). The agent 158a does not, however, reset other internal components such as the backup interface controller 318. Rather, the backup interface controller 318 takes over control of the partition-agent interface 316 to control communication between the agent 158a and the partition 104a when the processor 310 goes into reset (step 506).

In one embodiment of the present invention, the backup interface controller 318 is capable of performing minimal communications functions necessary to keep the partition 104a from crashing. For example, if the partition 104a initiates communication with the agent 158a over the communications link 112a by transmitting a message to the agent 158a while the processor 310 is in the process of resetting, the backup interface controller 318 may respond with an acknowledgment message (ACK) and/or a message indicating that the partition 104a should wait a predetermined amount of time and then attempt to re-initiate communication with the agent 158a. Those of ordinary skill in the art will appreciate how to implement such communications according to the particular communications protocol that is used to communicate over the communications link 112a.

By responding to communications initiated by the partition 104a, the backup interface controller 318 may comply with the requirements of the applicable communications protocol and thereby prevent a fault from occurring. As described above, the operating system 114a may, for example, be designed to expect that the agent 158a will always be available for communication over the communications link 112a. If a communication initiated by the partition 104a is not answered by the agent 158a within a predetermined amount of time, the operating system 114a may crash. The backup interface controller 318 may avert such a crash by responding to the operating system 114a with messages which indicate that the agent 158a is still physically connected to the communications link 112a and has not crashed, but without engaging in any substantive communication on behalf of the agent 158a.

When the processor 310 finishes resetting (step 508), the processor 310 may retake control of the interface 316 from the backup interface controller 318 (step 510). Assuming that the process of resetting the processor 310 has solved the problem that caused the generation of the reset signal received in step 602, the processor 310 may resume control of communication with the partition 104a over the communications link 112a.

In summary, in one embodiment of the present invention, any reset signal that is transmitted to the reset type selector 302 while the partition 104a is in an unsafe run state may be replaced by a high-level interrupt. This interrupt, rather than a reset signal, is transmitted to the agent 158a. In response, the agent 158a may perform a "soft" reset, in which the agent 158a reboots or restarts certain tasks or components (such as the processor 310), but in such a way that is invisible to any other components (such as the partition 104a) trying to communicate with the agent 158a.

Furthermore, using the techniques just described with respect to FIG. 3 and FIG. 4, the agent 158a may be reset (using a "soft" reset) without crashing any of the partitions 104a–c and without requiring that any of the individual partitions 104a–c or the entire computer system 150 be reset.

In some circumstances, a soft reset may not be sufficient to bring the agent 158a out of an undesirable state into a normal operating state. An example of such a state is one in which the agent's internal processor 310 is unable to communicate with the agent-partition interface 316 for some reason. In such a situation, the agent 158a may require a hard reset. Examples of techniques will now be disclosed for enabling a user of the server 150 to initiate such a hard reset after the user has had the opportunity to prepare for the reset, such as by saving data and transferring executing software applications from the partition 104a to another one of the partitions 104b–c. The agent 158a, and potentially the entire partition 104a, may then have a hard reset performed on it (i.e., power down and power up) to allow the agent 158a to restart in a correct initial state. Although such a hard reset will terminate any software processes executing in the partition, this need not be problematic because at the time of the hard reset the user has had the opportunity to terminate or transfer any necessary software processes to another partition or take other appropriate action.

Figure 6:
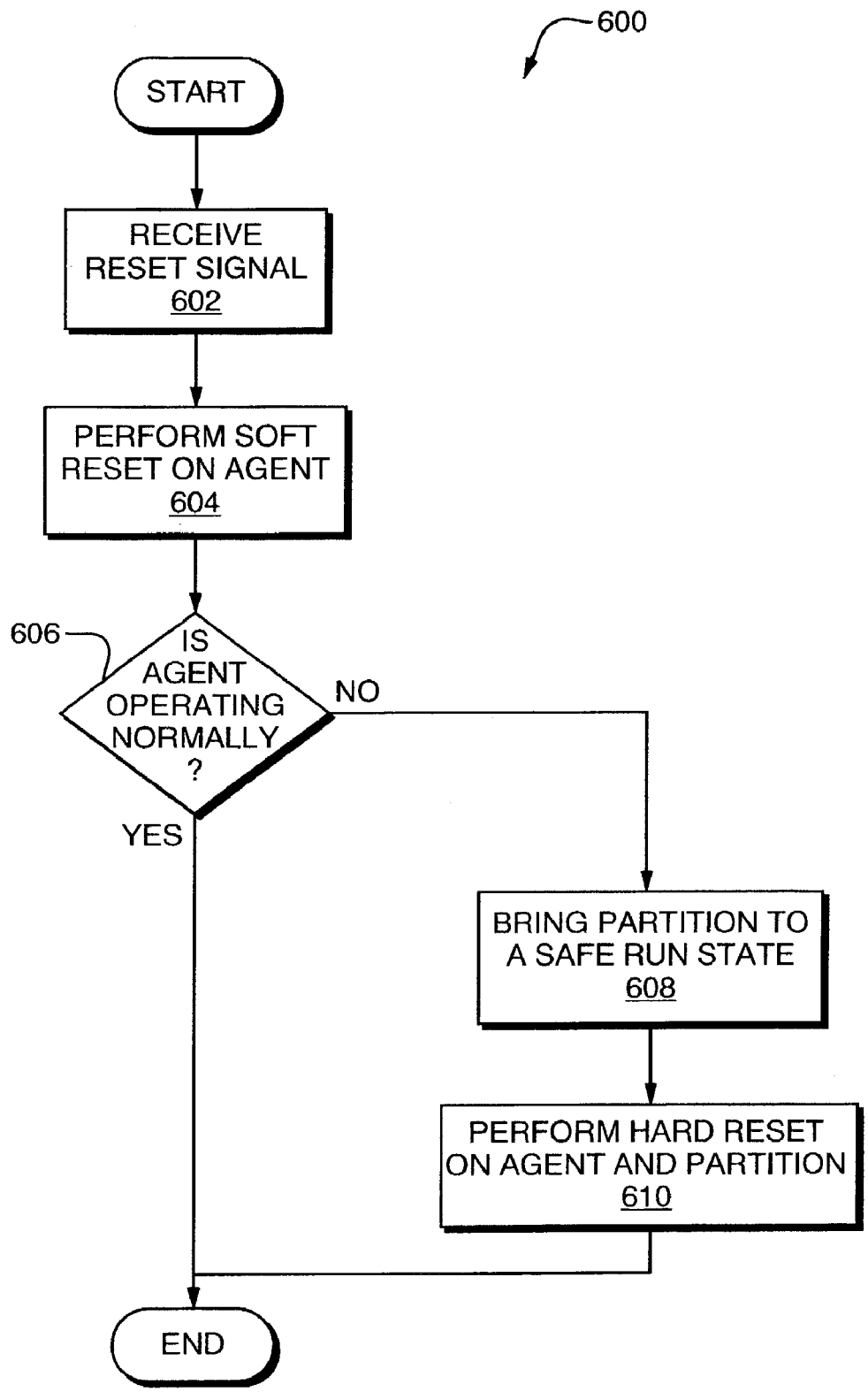
FIG. 6 is a flowchart of a method for resetting the agent of FIG. 3 according to a second embodiment of the present invention.

Referring to FIG. 6, a flowchart is shown of a method 600 that is performed by the server 150 to perform a hard reset on the agent 158a and the partition 104a in one embodiment of the present invention. The method 600 is intended to illustrate both a sequence of events which may lead to a set of circumstances in which a hard reset is required and the actions taken to perform such a hard reset.

The reset architecture 300 receives a reset signal (step 602). Assume, for purposes of example, that the reset architecture 300 receives the reset signal from the user 202b (FIG. 2) on reset line 204b when the user presses a hardware reset button on the server 150 after noticing that the agent 158a has apparently crashed or is otherwise non-responsive or behaving suboptimally. For example, the user 202b may notice that the partition 104a is unable to communicate with agent 158a. The user 202b, upon noticing such conditions, may have no readily available way to determine whether the partition 104a is in a safe run state or an unsafe run state. Rather, the user 202 may simply ascertain the need to reset the agent 158a and push the hardware reset button in response.

In the prior art systems described above with respect to FIG. 1A, such an action may cause the partition 104a or the entire server 100 to crash if the partition 104a is in an unsafe run state. In various embodiments of the present invention, however, such a crash is avoided by performing a soft reset on the agent 158a if the partition 104a is in an unsafe run state, as described above with respect to FIG. 4. Assume for purposes of example that the partition 104a is in an unsafe run state and that a soft reset is therefore performed on the agent 158a (step 604).

Upon completion of the soft reset, a determination is made of whether the agent 158a is in a normal operating state (step 606). This determination may, for example, be made automatically by circuitry and/or software which monitors the agent 158a. In one embodiment of the present invention, however, the user 202b makes the determination performed in step 606. If, for example, upon completion of the agent's soft reset, the partition 104a continues to exhibit the same or other suboptimal behavior that it exhibited prior to the soft reset, the user 202b may determine that the agent 158a is not in a normal operating state.

If the agent 158a is determined to be in a normal operating state (step 606), the method 600 terminates and the user 202b continues to use the partition 104a without performing any additional reset.

If, however, the agent 158a is determined not to be in a normal operating state, the partition 104a may be brought into a safe run state (step 608). As described above, one example of a safe run state is a run state in which no software programs are executing on the partition 104a. The partition 104a may be brought into a safe run state either automatically (e.g., by the issuance of a software shutdown command to the operating system 114a) or by the user 202b. The user 202b may, for example, transfer software programs that are executing in the partition 104a to other ones of the partitions 104b–c. Performing such a transfer enables such software programs to continue executing without interruption. The user 202b may then terminate the operating system 114a by issuing a software shutdown command to the operating system 114a, thereby bringing the partition 104a into a safe run state.

The user 202b may then generate another reset signal on reset line 204b by, for example, pressing the hardware reset button. When this reset signal is received by the reset type selector 302 (FIG. 4, step 402), the reset type selector 302 will determine that the partition 104a is in a safe run state (step 404) and output a reset signal on reset line 160a (step 406), thereby causing the agent 158a to perform a hard reset (FIG. 6, step 610). Such a hard reset will not cause the partition 104a to crash because the partition 104a is in a safe run state.

Among the advantages of the invention are one or more of the following.

Using the techniques described above, an agent in a computer system may be reset without causing a corresponding partition in the computer system to crash. This ability is crucial for high-availability systems, such as servers, that are expected and relied upon never to crash. This ability is particularly crucial for partitionable servers, in which the crash of one partition may cause other partitions to crash, thereby effectively causing multiple servers to crash at once.

A related advantage of the techniques described above is that they enable an agent to be reset even while a corresponding partition is in a run state in which resetting the agent would normally cause the partition to crash. This ability is enabled by using a soft reset, rather than a hard reset, to reset the agent. This feature is useful because an agent may become disabled or otherwise require a reset under circumstances in which the corresponding partition is in an unsafe run state, and in which it is not possible for the user to bring the partition into a safe run state. The partition may, for example, be executing critical software applications (such as server software) that cannot be terminated or otherwise interrupted. The ability to reset the agent using a soft reset without causing the partition to crash enables the agent to be brought back to a normal operating condition without interrupting the operation of the partition.

Another advantage of the techniques disclosed above is that they reflect a recognition that a soft reset may not always be sufficient to bring an agent back to a normal operation condition, and thereby allow a hard reset to be performed on the agent in such circumstances. Even when a hard reset is performed on an agent, however, the techniques disclosed herein enable the user to first bring the corresponding partition into a safe run state before performing the hard reset, thereby averting a crash of the partition and the other problems described herein.

One advantage of the reset architecture 300 disclosed herein is that it may be implemented by making internal changes to the prior art reset architecture 200 in such a manner that such changes are not visible either to the user 202b or to other components of the server 150. For example, as shown in FIG. 3, the reset sources 202a–c are coupled to the OR gate 206 in the same manner in both the reset architecture 300 and the prior art reset architecture 200 (FIG. 2). Similarly, the partition 104a is coupled to the agent 158a over the communications link 112a in the same manner in both the reset architecture 300 and the prior art reset architecture 200. As a result, features of the embodiments described herein may be implemented solely within the reset architecture 300, i.e., without requiring changes to the rest of the server 150. This both simplifies the design and implementation of the reset architecture 300 and enables the reset sources 202a–c (including the user 202b) to interact with the reset architecture 300 in the same manner as they interact with the prior art reset architecture 200. For example, when the user 202b notices that the agent 158a has crashed or otherwise requires a reset, the user 202b may press a hardware reset button on the server 150 in the same manner as in the prior art. Unbeknownst to the user 202b, however, the reset architecture 300 may automatically perform a soft reset on the agent 158a rather than a hard reset. Configuring the reset architecture 300 in this way simplifies the operation of the server 150 from the user's point of view and reduces the amount of re-training the user 202b may need to undergo to utilize the modified server 150.

It is to be understood that although the invention has been described above in terms of particular embodiments, the foregoing embodiments are provided as illustrative only, and do not limit or define the scope of the invention. Various other embodiments, including but not limited to the following, are also within the scope of the claims.

The term "agent" is used herein to refer to any component (or set of components) of a computer system that is capable of being reset. Multiple agents in a computer system may be reset from a single reset source or from multiple reset sources. An agent may, for example, include a processor, a management processor that monitors a corresponding partition and provides data back to the partition about its state, or other circuitry. The term "agent" may be used to describe a set of hardware, firmware, software, or any combination thereof. Although the terms "agent" and "partition" are used in the examples above in contrast with each other, a partition itself could be considered to be an agent. Therefore, a multi-partition computer system is an example of a multi-agent computer system.

Although the server 150 shown in FIG. 1B includes three partitions 104a–c and three agents 158a–c arranged in a one-to-one correspondence, this is not a limitation of the present invention. Rather, the techniques disclosed herein are applicable to systems including any number of agents and/or partitions in any configuration. For example, the techniques disclosed herein are applicable to computer systems having only a single partition. Furthermore, the techniques disclosed herein are not limited to computer systems in which partitions and agents communicate with each other over a communications link. Rather, other configurations are within the scope of the present invention. For example, the techniques disclosed herein may be applied to systems in which the agents are included within the partitions, or to systems in which multiple agents are coupled to and communicate with each other. Furthermore, the techniques disclosed herein are not limited to computing systems in which all agents reside within a single physical housing. Rather, the techniques disclosed herein may be applied to computing systems in which one or more agents are coupled to the computing system by a serial/parallel cable, network connection, or other coupling.

Although the system 150 is described herein as a "server," the techniques disclosed herein are not limited to use with computing systems that are used in a client-server architecture or that otherwise qualify as servers. Rather, the techniques disclosed herein may be applied to any kind of computing system.

Although in the examples described above, a soft reset is performed on the agent 158a by resetting the agent's processor 310, soft resets may be performed in accordance with the present invention in other ways. In general, a soft reset involves resetting any subset of an agent's components. A component of an agent may be reset in any of a variety of ways, and the term "reset" is not limited to performing a hardware reset on a component by supplying it with a hardware reset signal. Rather, the term "reset" refers more generally to bringing a component to a predefined initial state. A digital memory, for example, may be reset by clearing its contents even if doing so does not involve providing a particular hardware reset signal to the memory or activating particular reset circuitry within the memory.

Although three reset sources 202*a–c* are described above, this is not a limitation of the present invention. Rather, there may be any kind and number of reset sources in any combination. Furthermore, the OR gate 206 is disclosed merely for purposes of example. More generally, reset sources may be combined and/or selected in any manner.

Elements and components described herein may be further divided into additional components or joined together to form fewer components for performing the same functions. For example, the OR gate, reset type selector 302, and run state identifier 312, or any subset thereof, may be further combined together to form a lesser number of components for performing the same functions. Similarly, the partition-agent interface 316 and the backup interface controller 318 may be combined into a single component.

The techniques described above may be implemented, for example, in hardware, software, firmware, or any combination thereof. For example, the reset type selector 302, run state identifier 312, backup interface controller 318, and partition-agent interface 316 may be implemented in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. In a computer system including a first agent and a second agent, a computer-implemented method comprising steps of:
   (A) receiving a first reset signal directed to the first agent;
   (B) determining whether the second agent is in a first run state in a predetermined class of run states in which a hard reset can be performed on the first agent without requiring the second agent to be reset;
   (C) performing the hard reset on the first agent if it is determined that the second agent is in the first run state in the predetermined class of run states; and
   (D) performing a soft reset on the first agent if it is determined that the second agent is in a second run state in the predetermined class of run states in which a hard reset cannot be performed without requiring the second agent to be reset.

2. The method of claim 1, wherein the second agent comprises a partition in the computer system.

3. The method of claim 2, wherein the step (B) comprises steps of:
   (B)(1) determining whether an operating system is executing in the partition; and
   (B)(2) determining that the partition is in the first run state in the predetermined class of run states if it is determined that no operating system is executing in the partition.

4. The method of claim 1, wherein the step (A) comprises a step of receiving the first reset signal from a power monitor that monitors power supplied to the first agent.

5. The method of claim 1, wherein the step (A) comprises a step of receiving the first reset signal from a user of the computer system.

6. The method of claim 1, wherein the step (A) comprises a step of receiving the first reset signal from a watchdog timer coupled to the first agent.

7. The method of claim 1, wherein the step (B) comprises steps of:
   (B)(1) determining whether the second agent is in a powered-down state; and
   (B)(2) determining that the second agent is in the first run state in the predetermined class of run states if it is determined that the second agent is in the powered-down state.

8. The method of claim 1, wherein the step (C) comprises a step of transmitting a second reset signal to the first agent.

9. The method of claim 1, wherein the step (D) comprises a step of transmitting an interrupt signal to the first agent.

10. The method of claim 9, wherein the first agent is configured to service interrupt signals having priorities ranging from a minimum priority to a maximum priority, and wherein the step (D) comprises a step of transmitting to the first agent the interrupt signal, the interrupt signal having the maximum priority.

11. The method of claim 1, wherein the first agent comprises a plurality of components, and wherein the step (D) comprises a step of:
   (D)(1) resetting fewer than all of the plurality of components.

12. The method of claim 11, wherein the plurality of components comprises a processor, and wherein the step (D)(1) comprises a step of resetting the processor.

13. The method of claim 11, wherein the computer system further comprises an interface for facilitating communication between the first and second agents, wherein the first agent controls the interface, and wherein the step (D) further comprises steps of:
- (D)(2) transferring control of the interface to a backup interface controller; and
- (D)(3) after step (D)(1) has completed, transferring control of the interface back to at least one of the plurality of components reset in step (D)(1).

14. The method of claim 11, wherein the computer system further comprises an interface for facilitating communication between the first and second agents, and wherein the step (D) is performed without disabling the interface.

15. The method of claim 11, wherein the step (D) is performed while the second agent communicates with the interface.

16. The method of claim 11, wherein the step (D) is performed without resetting the second agent.

17. The method of claim 11, wherein the step (D) is performed without resetting the computer system.

18. The method of claim 17, wherein the computer system comprises a plurality of partitions, wherein the second agent comprises one of the plurality of partitions, and wherein the step (D) is performed without resetting the plurality of partitions.

19. The method of claim 1, wherein the first agent comprises an input/output controller.

20. The method of claim 1, wherein the first agent comprises a manageability processor.

21. In a computer system including an agent and a partition associated with the agent, a computer-implemented method comprising steps of:
- (A) receiving a first reset signal directed to the agent;
- (B) determining whether the partition is in a first run state in a predetermined class of run states in which a hard reset can be performed on the agent without requiring the partition to be reset;
- (C) performing a hard reset on the agent by transmitting a second reset signal to the agent if it is determined that the partition is in the first run state in the predetermined class of run states; and
- (D) resetting fewer than all of a plurality of components of the agent by transmitting an interrupt to the agent if it is determined that the partition is in a second run state in the predetermined class of run states in which a hard reset cannot be performed without requiring the partition to be reset.

22. The method of claim 21, wherein the step (D) is performed without resetting the partition.

23. In a computer system including a first agent and a second agent, a device comprising:
- receiving means for receiving a first reset signal directed to the first agent;
- determining means for determining whether the second agent is in a run state in a predetermined class of first run states in which a hard reset can be performed on the first agent without requiring the second agent to be reset;
- hard reset means for performing the hard reset on the first agent if it is determined that the second agent is in the first run state in the predetermined class of run states; and
- soft reset means performing a soft reset on the first agent if it is determined that the second agent is in a second run state in the predetermined class of run states in which a hard reset cannot be performed without requiring the second agent to be reset.

24. The device of claim 23, wherein the second agent comprises a partition in the computer system.

25. The device of claim 23, wherein the hard reset means comprises means for transmitting a second reset signal to the first agent.

26. The device of claim 23, wherein the soft reset means comprises means for transmitting an interrupt signal to the first agent.

27. The device of claim 26, wherein the first agent is configured to service interrupt signals having priorities ranging from a minimum priority to a maximum priority, and wherein the soft reset means comprises means for transmitting to the first agent the interrupt signal, the interrupt signal having the maximum priority.

28. The device of claim 23, wherein the first agent comprises a plurality of components, and wherein the soft reset means comprises means for resetting fewer than all of the plurality of components.

29. The device of claim 28, wherein the plurality of components comprises a processor, and wherein the soft reset means comprises means for resetting the processor.

30. The device of claim 23, wherein the soft reset means comprises means for performing the soft reset on the first agent without resetting the second agent.

31. A reset architecture for use in a computer system including a first agent and a second agent, the reset architecture comprising:
- a run state identifier coupled to the second agent, the run state identifier comprising:
  - means for determining whether the second agent is in a first run state in a predetermined class of run states in which a hard reset can be performed on the first agent without requiring the second agent to be reset; and
  - an output providing a run state signal indicative of whether the second agent is in the first run state in the predetermined class of run states; and
- a demultiplexer comprising:
  - a data input coupled to at least one reset source;
  - a selection input coupled to the output of the run state identifier;
  - an interrupt output coupled to an interrupt input of the first agent; and
  - a reset output coupled to a reset input of the first agent;
- wherein the first agent comprises means for performing a hard reset in response to receipt of a reset signal on the reset input and means for performing a soft reset in response to receipt of an interrupt signal on the interrupt input while the second agent is in a second run state in the predetermined class of run states in which a hard reset cannot be performed without requiring the second agent to be reset.

32. In a computer system including a partition and an agent associated with the partition, a computer-implemented method comprising steps of:
- (A) receiving a first reset signal directed to the agent;
- (B) in response to the first reset signal, performing a soft reset on the agent while the partition is in a first run state in a first predetermined class of run states in which a hard reset cannot be performed on the agent without requiring the partition to be reset; and
- (C) performing the hard reset on the agent while the partition is in a second run state in a second predetermined class of run states in which the hard reset can be performed on the agent without requiring the partition to be reset.

33. The method of claim 32, further comprising a step of:
(D) prior to the step (C), determining whether the partition is in the second run state in the second predetermined class of run states; and
wherein the step (C) is performed only if it is determined in step (D) that the partition is in the second run state in the second predetermined class of run states.

34. The method of claim 33, wherein the step (D) comprises a step of determining whether at least one software program executing in the partition has been terminated.

35. The method of claim 34, wherein the at least one software program comprises an operating system.

36. The method of claim 33, wherein the step (D) comprises a step of determining whether the partition is in a powered-down state.

37. The method of claim 32, further comprising a step of:
(D) prior to the step (C), determining that the partition is in the second run state in the second predetermined class of run states; and
wherein the step (C) is performed in response to the performance of the step (D).

38. The method of claim 32, wherein the step (A) comprises a step of receiving the first reset signal from a user of the computer system.

39. The method of claim 32, wherein an operating system executes in the partition in the first run state in the second predetermined class of run states.

40. The method of claim 32, wherein the agent comprises a plurality of components, and wherein the step (B) comprises a step of resetting fewer than all of the plurality of components.

41. The method of claim 40, wherein the plurality of components comprises a processor, and wherein the step (B) comprises a step of resetting the processor.

42. The method of claim 40, wherein the agent further comprises an interface for communicating with the partition, and wherein the step (B) is performed without disabling the interface.

43. The method of claim 40, wherein the step (B) is performed without resetting the partition.

44. The method of claim 40, wherein the step (B) is performed without resetting the computer system.

45. The method of claim 44, wherein the computer system comprises a plurality of partitions including the partition associated with the agent, and wherein the step (B) is performed without resetting the plurality of partitions.

46. The method of claim 32, wherein the step (D) comprises a step of transmitting a second reset signal to the agent.

47. The method of claim 32, wherein the step (B) comprises a step of transmitting an interrupt signal to the agent.

48. The method of claim 47, wherein the agent is configured to service interrupt signals having priorities ranging from a minimum priority to a maximum priority, and wherein the step (B) comprises a step of transmitting the interrupt signal, the interrupt signal having the maximum priority to the agent.

49. The method of claim 32, further comprising a step of:
(D) prior to the step (C), receiving a second reset signal from a user of the computer system; and
wherein the step (C) is performed in response to performance of the step (D).

50. The method of claim 32, further comprising a step of:
(D) prior to the step (C), bringing the partition into the second run state in the second predetermined class of run states.

51. In a computer system including a partition and an agent associated with the partition, a computer-implemented method comprising steps of:
(A) receiving a first reset signal directed to the agent;
(B) in response to the first reset signal, performing a soft reset on the agent without resetting the partition by transmitting an interrupt signal to the agent while the partition is in a first run state in a first predetermined class of run states in which a hard reset cannot be performed on the agent without requiring the partition to be reset;
(C) determining that the partition is in a second run state in a second predetermined class of run states in which the hard reset can be performed on the agent without requiring the partition to be reset; and
(D) performing the hard reset on the agent by transmitting a second reset signal to the agent while the partition is in the second run state in the second predetermined class of run states.

52. The method of claim 51, wherein the agent comprises a plurality of components, and wherein the step (B) comprises a step of resetting fewer than all of the plurality of components.

53. In a computer system including a partition and an agent associated with the partition, a device comprising:
receiving means for receiving a first reset signal directed to the agent;
soft reset means for performing a soft reset on the agent while the partition is in a first run state in a first predetermined class of run states in which a hard reset cannot be performed on the agent without requiring the partition to be reset; and
hard reset means for performing the hard reset on the agent while the partition is in a second run state in a second predetermined class of run states in which the hard reset can be performed on the agent without requiring the partition to be reset.

54. The device of claim 53, wherein no operating system executes in the partition in the second run state in the second predetermined class of run states.

55. The device of claim 53, wherein the agent comprises a plurality of components, and wherein the soft reset means comprises means for resetting fewer than all of the plurality of components.

56. The device of claim 55, wherein the plurality of components comprises a processor, and wherein the soft reset means comprises means for resetting the processor.

57. The device of claim 55, wherein the soft reset means comprises means for performing the soft reset on the agent without resetting the partition.

58. The device of claim 53, wherein the hard reset means comprises means for transmitting a second reset signal to the agent.

59. The device of claim 53, wherein the soft reset means comprises means for transmitting an interrupt signal to the agent.

* * * * *

UNITED STATES PATENT AND TRADEMARK OFFICE
CERTIFICATE OF CORRECTION

PATENT NO. : 7,089,413 B2  Page 1 of 1
APPLICATION NO. : 10/382346
DATED : August 8, 2006
INVENTOR(S) : Michael John Erickson et al.

It is certified that error appears in the above-identified patent and that said Letters Patent is hereby corrected as shown below:

In column 15, line 55, in Claim 23, insert -- first -- before "run state".

In column 15, line 55, in Claim 23, after "class of" delete "first".

In column 17, line 26, in Claim 39, after "state in the" delete "second" and insert -- first --, therefor.

Signed and Sealed this

Third Day of February, 2009

JOHN DOLL
*Acting Director of the United States Patent and Trademark Office*